United States Patent [19]

Chasteen et al.

[11] Patent Number: 5,186,279
[45] Date of Patent: Feb. 16, 1993

[54] METHOD AND APPARATUS FOR LUBRICATING TAB STOCK

[75] Inventors: Howard Chasteen, Westminster; Todd Farley, Golden; Richard Cramer; Michael Lockner, both of Arvada, all of Colo.

[73] Assignee: Ball Corporation, Muncie, Ind.

[21] Appl. No.: 666,725

[22] Filed: Mar. 8, 1991

[51] Int. Cl.$^5$ ............................................. F16N 7/24
[52] U.S. Cl. ................................ 184/15.1; 184/10; 118/122; 118/405; 118/414; 118/419
[58] Field of Search ............ 184/6.14, 15.1, 15.2, 184/15.3, 16, 17, 10, 63, 87, 101, 102, 3, 19, 22, 25; 413/18, 25, 78; 118/404, 405, 419, 117, 122, 413, 414

[56] References Cited

U.S. PATENT DOCUMENTS

| | | | |
|---|---|---|---|
| 778,191 | 12/1904 | Hall | 184/17 |
| 2,140,426 | 12/1938 | Hodson | 184/15.1 |
| 2,301,619 | 11/1942 | Davis | 118/414 |
| 2,435,120 | 1/1948 | Baker | 184/15.1 |
| 3,332,393 | 7/1967 | Hoover | 118/404 |
| 3,350,248 | 10/1967 | Demarest, Jr. et al. | 118/405 |
| 3,643,628 | 2/1972 | Sugarman et al. | 118/414 |
| 3,733,216 | 5/1973 | Goldman et al. | 184/15.1 |
| 4,063,617 | 12/1977 | Shenk | 184/15.1 |
| 4,259,379 | 3/1981 | Britton et al. | 118/405 |
| 4,302,485 | 11/1981 | Last et al. | 118/419 |
| 4,340,623 | 7/1982 | Justus | 118/405 |
| 4,498,558 | 2/1985 | Bendahan | 184/15.1 |
| 4,569,621 | 2/1986 | Sjögren et al. | 413/25 |
| 4,593,923 | 6/1986 | Thalmann | 184/15.1 |
| 4,643,126 | 2/1987 | Wilkinson et al. | 118/405 |
| 4,679,524 | 7/1987 | Eklund | 118/405 |
| 4,901,820 | 2/1990 | Fry | 184/15.1 |

FOREIGN PATENT DOCUMENTS

| | | | |
|---|---|---|---|
| 0546603 | 4/1956 | Belgium | 184/16 |
| 0728935 | 5/1980 | U.S.S.R. | 118/414 |
| 0711396 | 6/1954 | United Kingdom | 184/15.3 |

Primary Examiner—Stephen F. Husar
Assistant Examiner—Alan B. Cariaso
Attorney, Agent, or Firm—Gilbert E. Alberding

[57] ABSTRACT

A lubricator (28) is provided to lubricate tab stock (82) prior to forming the tab stock (82) into pull tabs. The lubricator (28) comprises felt pads (36-38) for removing contaminants from the tab stock (82) prior to lubrication thereof. A hydrostatic chamber (40) receives and disperses lube (42) from a source (44). As the tab stock (82) passes through the chamber (40) the lube (42) coats the tab stock (82). Subsequently, the tab stock (82) passes through wipers (50-52) and metering rollers (58-60) to remove all but a predetermined quantity of the lube (42). A collector (70) is provided to collect any excess lube (42) and return same to the source (44) through a return line (72) thus allowing recycling of the lube (42).

20 Claims, 5 Drawing Sheets

METHOD AND APPARATUS FOR LUBRICATING TAB STOCK

FIELD OF THE INVENTION

This invention relates in general to can making, and in particular to a method and apparatus for lubricating tab stock prior to formation thereof into a pull tab.

BACKGROUND OF THE INVENTION

In the can making art, the can body and the sealable tops therefor are typically made in separate operations. Similarly, in making the sealable tops, there are separate operations for making the top and for making the pull tab. Once the separate operations are completed, the pull tabs are affixed to the tops for subsequent sealing to the can body.

As is well known, it is desirable to coat a metal with a lube prior to die punching or stamping thereof. It is desirable to lubricate the metal because this allows the tools to work more efficiently as well as to preserve the cutting edges thereof for a longer period of time.

In the formation of pull tabs from tab stock, a length of a thin flat material such as aluminum is fed through a lubricating device prior to the formation of the pull tab. In the only type of lubricating device known to the applicants, a lube is dripped onto a pair of felt pads between which the tab stock passes. Preferably, the lube should be evenly applied to the tab stock prior to its formation into pull tabs. In practice, however, uniform application has been difficult to achieve.

Specifically, difficulties have arisen due to accumulation in the felt pads of metal scraps and other contaminants. While removal of such materials prior to pull tab formation is desirable, the accumulation thereof in the felt pads will eventually clog the felt pads and disrupt the lube drip rate. As will be appreciated, avoidance of undesirable accumulation entails the undesirable requirement of shutting down the equipment to remove and clean, or to replace the clogged felt pads.

Uneven lube application can also result from drip rate variations caused by machine vibrations and lube evaporation. In the latter regard, low viscosity lubes which comprise approximately 80% evaporative carrier and 20% actual lubricant have been typically employed to accommodate the wicking requirements of the felt pads. That is, while lubes comprising a greater percentage of lubricant would be preferable from a reduction of evaporation standpoint, wicking within the felt pads requires a more watery consistency as opposed to oily consistency.

SUMMARY OF THE INVENTION

The invention disclosed herein comprises a method and apparatus for lubricating a material to be shaped which substantially eliminates or reduces problems associated with the above-described prior lubricator. The present invention allows the application of a lube to a material to be shaped in a more efficient and cost effective manner.

In accordance with one aspect of the present invention, a device for lubricating a material to be shaped is provided. The device comprises a hollow container within which a set of wiping pads removes contaminants from tab stock prior to lubrication. Subsequent to the wiping pads, the tab stock enters a hydrostatic chamber which is filled with the lube. The tab stock is completely coated with the lube within the chamber.

Subsequent to the application of lube in the hydrostatic chamber, the tab stock passes between a pair of wiper blades which remove excess lube therefrom. A pair of metering rollers are then provided for precise metering of the lube evenly on the tab stock which is then passed to the appropriate apparatus for forming the pull tabs.

There is preferably a collector and run off line for catching excess lube from the chamber and the wiping and metering devices. The excess lube is then returned to a source such as a drum or tank which allows reuse thereof. Prior to pumping the lube back through the system, the lube is filtered to remove any contaminants therein, and thus a more efficient use of the lube is allowed than in prior lubricating devices.

It is a technical advantage of the present invention that a more uniform application of lube is provided. It is a further technical advantage that the present invention allows recycling of the lube. It is a still further technical advantage of the present invention that it allows the use of higher viscosity lubes.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION OF THE INVENTION

Figure 1:
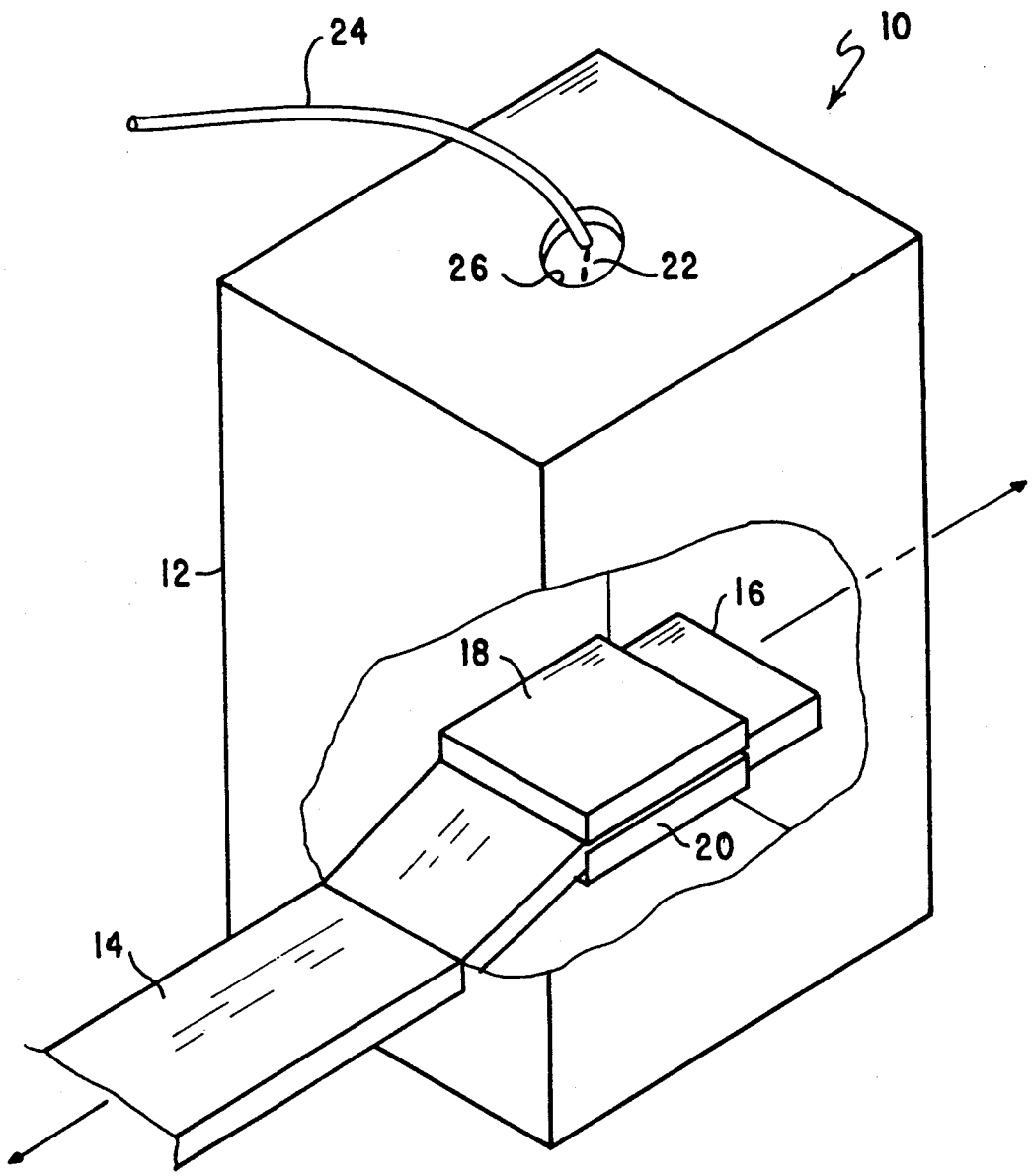
FIG. 1 is a partially cutaway perspective view of a lubricator in accordance with the prior art.

Referring to FIG. 1, a partially cutaway perspective view of a lubricator in accordance with the prior art is generally identified by the reference numeral 10. The lubricator 10 comprises a container 12 having an infeed 14 and an exit 16.

Tab stock (not shown) such as a thin flat length of aluminum is fed through the infeed 14 into the container 12. Upon entering the container 12, the tab stock is passed between a first pad 18 and a second pad 20, each of which comprise felt. A lube 22 is fed to the container 12 from a drip pipe 24. The lube 22 comprises, for example, a low viscosity and highly volatile lube which generally comprises 80% carrier and 20% lubricant. The lube 22 is fed through a hole 26 in the container 12 to the pads 18 and 20 at a rate intended to be sufficient to keep the pads 18 and 20 soaked therewith. As the tab stock passes between the pads 18 and 20, the lube 22 is applied thereto by a wiping action.

There is no collection capability or return line in the lubricator 10 to allow for recycling of excess lube 22. As such, any lube 22 that does not evaporate, (including, for example, lube that accumulates in the pads 18–20 if the same are flooded by an incorrect drip rate), is not recycled through the system, and therefore the lubricator 10 is not as efficient as it could be.

Upon exiting the lubricator 10, the tab stock should be soaked with the lube 22 and is passed to the appropriate pull tab forming equipment prior to being merged with and attached to a can top. Due to the high volatility of the carrier in the lube 22, a significant percentage of the lube 22 may evaporate prior to the pull tab formation process. Thus, the pull tab making equipment may wear at an unacceptably high rate.

Figure 2:
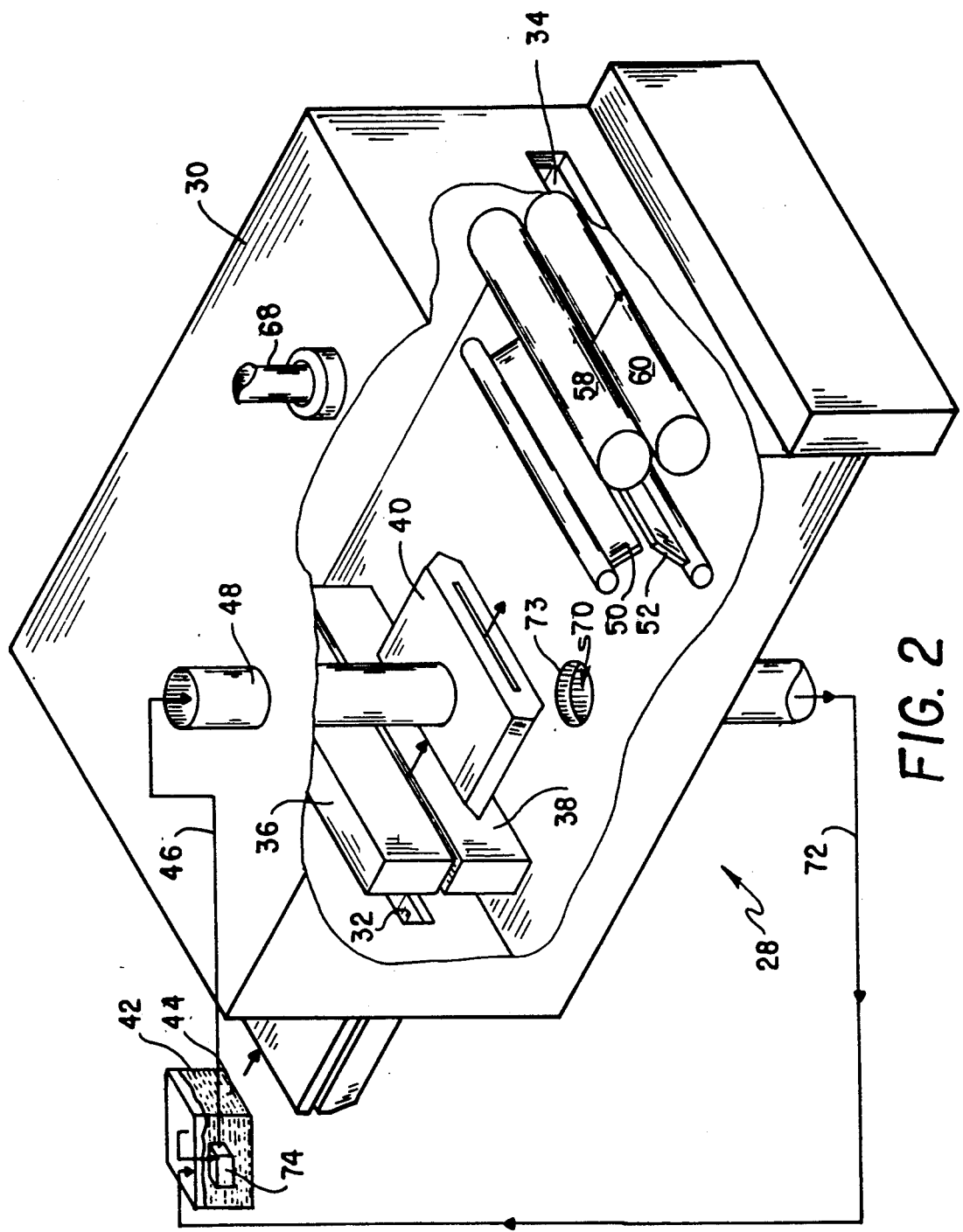
FIG. 2 is a partially cutaway perspective view of a lubricator constructed in accordance with an embodiment of the present invention.

Referring to FIG. 2, a partially cutaway isometric view of a lubricator 28 constructed in accordance with an embodiment of the present invention is illustrated. The lubricator 28 comprises a container 30 for receiving the various parts of the lubricator 28. Tab stock 82 (see FIG. 3) enters through an opening 32 in the container 30 and exits therefrom through an outlet 34 to pull tab making equipment (not shown).

Upon entering the container 30, the tab stock 82 passes between a first pad 36 and a second pad 38 which wipe away any contaminants such as dirt or metal shavings that may be on the tab stock 82. The pads 36 and 38 may comprise felt or any other material suitable for wiping contaminants from the tab stock 82.

After having contaminants removed, the tab stock 82 enters a hydrostatic chamber 40. A lube 42 which may be either a low viscosity lube similar to the lube 22 previously described above or a higher viscosity lube with a greater percentage of lubricant is pumped from a source 44 such as a tank or a drum through a line 46 and a feed pipe 48 into the hydrostatic chamber 40. As the lube 42 enters the hydrostatic chamber 40 it surrounds and completely covers the tab stock 82 which passes therethrough.

After exiting the hydrostatic chamber 40, the tab stock 82 passes between a first wiper 50 and a second wiper 52. The first and second wipers 50-52 may comprise any appropriate material such as, for example, rubber or a synthetic material capable of wiping excess lube 42 from the tab stock 82. The first wiper 50 is spring loaded by a tensioning device 54 (see FIG. 4) while the second wiper 52 is positioned in a fixed relationship thereto. As the wiper material is worn away from contact with the passing tab stock 82, the first wiper 50 may be adjusted to apply the correct wiping action through the use of the tensioning device 54, as will be subsequently described in greater detail. After passing through the first and second wipers 50-52, the tab stock 82 passes between a first metering roller 58 and a second metering roller 60. The first and second metering rollers 58 and 60 have a covering thereon which may comprise, for example, Buna-N Rubber having a hardness of 50-55 durometers, which meters the lube 42 from the tab stock 82 to allow only the desired thickness of lube 42 to remain thereon. The second metering roller 60 is fixed in position whereas the first metering roller 58 is spring loaded by a pressure device 62 (see FIG. 5). After passing through the metering rollers 58-60, the tab stock 82 leaves the container 30 through the outlet 34 for further processing into pull tabs.

Below the hydrostatic chamber 40, the wipers 50-52 and the metering rollers 58-60 is a collector portion 70 for directing lube 42 which is wiped or metered from the tab stock 82 or spills from the hydrostatic chamber 40 to a drain hole 73. The lube 42 is passed from the collector portion 70 through a line 72 back to the source 44. Prior to being pumped (by a pump, not shown) back into the container 30, the lube 42 passes through at least one filter 74 which removes any contaminants that may have been deposited therein. As a result of the collector portion 70 and the filter 74, the lube 42 may be reused many times over. Thus as a result of the present invention, a more economical usage of tab lube is possible.

Figure 3:
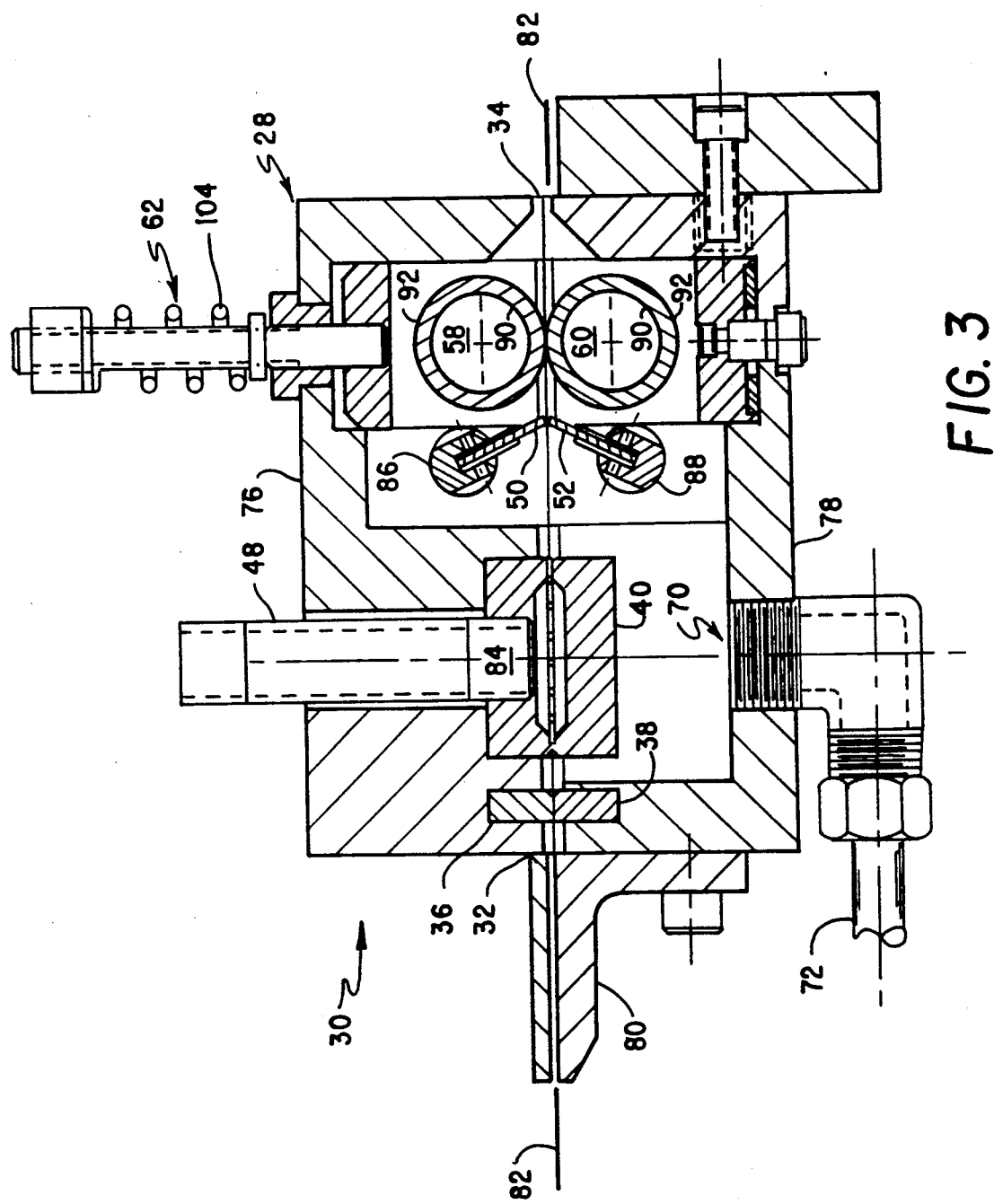
FIG. 3 is a cross-sectional view of the lubricator of FIG. 2.

Referring to FIG. 3, a side cross-sectional view of the lubricator 28 is shown. The container 30 comprises a metallic support structure having a top portion 76 and a bottom portion 78. Fitted within the top portion 76 and bottom portion 78 are the components of the lubricator 28. Affixed to the container 30 proximate the inlet 32 is a support plate and passage 80 upon which tab stock 82 is guided to the inlet 32.

After passing through the inlet 32, the tab stock 82 passes between the first pad 36 and the second pad 38 for the removal of contaminants therefrom. The first pad 36 and second pad 38 are positioned to allow the tab stock 82 to pass therebetween yet close enough together to wipe contaminants therefrom. After passing between the first pad 36 and the second pad 38, the tab stock 82 enters the hydrostatic chamber 40.

The hydrostatic chamber 40 may comprise any appropriate material which is sufficiently rigid such as metal, plastic, or other synthetic materials. The feed pipe 48 enters the hydrostatic chamber 40 through an opening 84 therein. As the lube 42 enters the hydrostatic chamber 40, it is dispersed throughout the chamber 40 and thus completely soaks the tab stock 82.

Upon leaving the hydrostatic chamber 40, the tab stock 82 passes between the first wiper 50 and the second wiper 52. The wipers 50-52 are secured within a first roller 86 and a second roller 88, respectively. As previously described above, the second wiper 52 is fixed in position relative to the first wiper 50. However, the first wiper 50 is adjustably positioned in order to allow for adjustment over time due to wear. The wipers 50-52 press against the tab stock 82 to wipe excess lube 42 therefrom before passing between the metering rollers 58-60.

Figure 4:
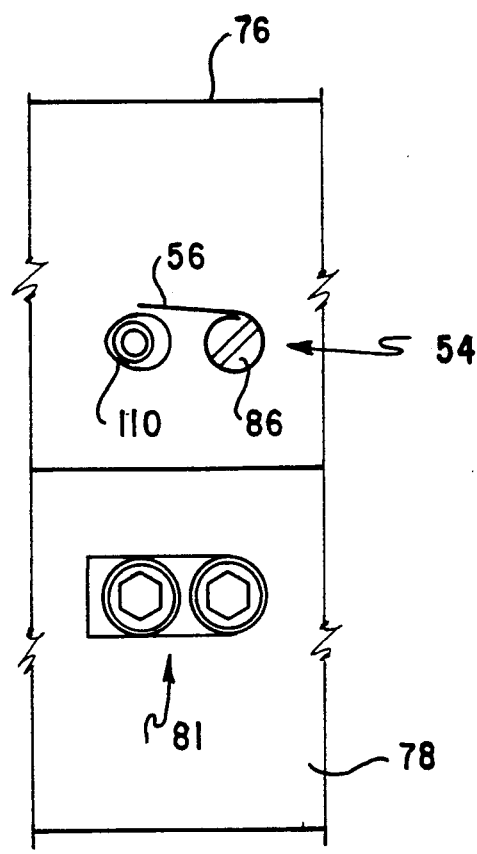
FIG. 4 is a partial side elevation showing the wiper blade tensioning device.

Referring to FIG. 4, the tensioning device 54 is shown is side elevation. The first roller 86 extends through a sidewall of the top portion 76 of the container 30 far enough to attach a spring 56 thereto. A portion of the spring 56 extends from the roller 86 into contact with an eccentric 110. By turning the eccentric 110, the spring 56 causes the roller 86 to turn clockwise or counterclockwise to adjustably position the first wiper 50 relative to the second wiper 52. The second roller 88 is bolted in a fixed relationship through a sidewall in the bottom portion 78 of the container 30 by an assembly 81.

Figure 5:
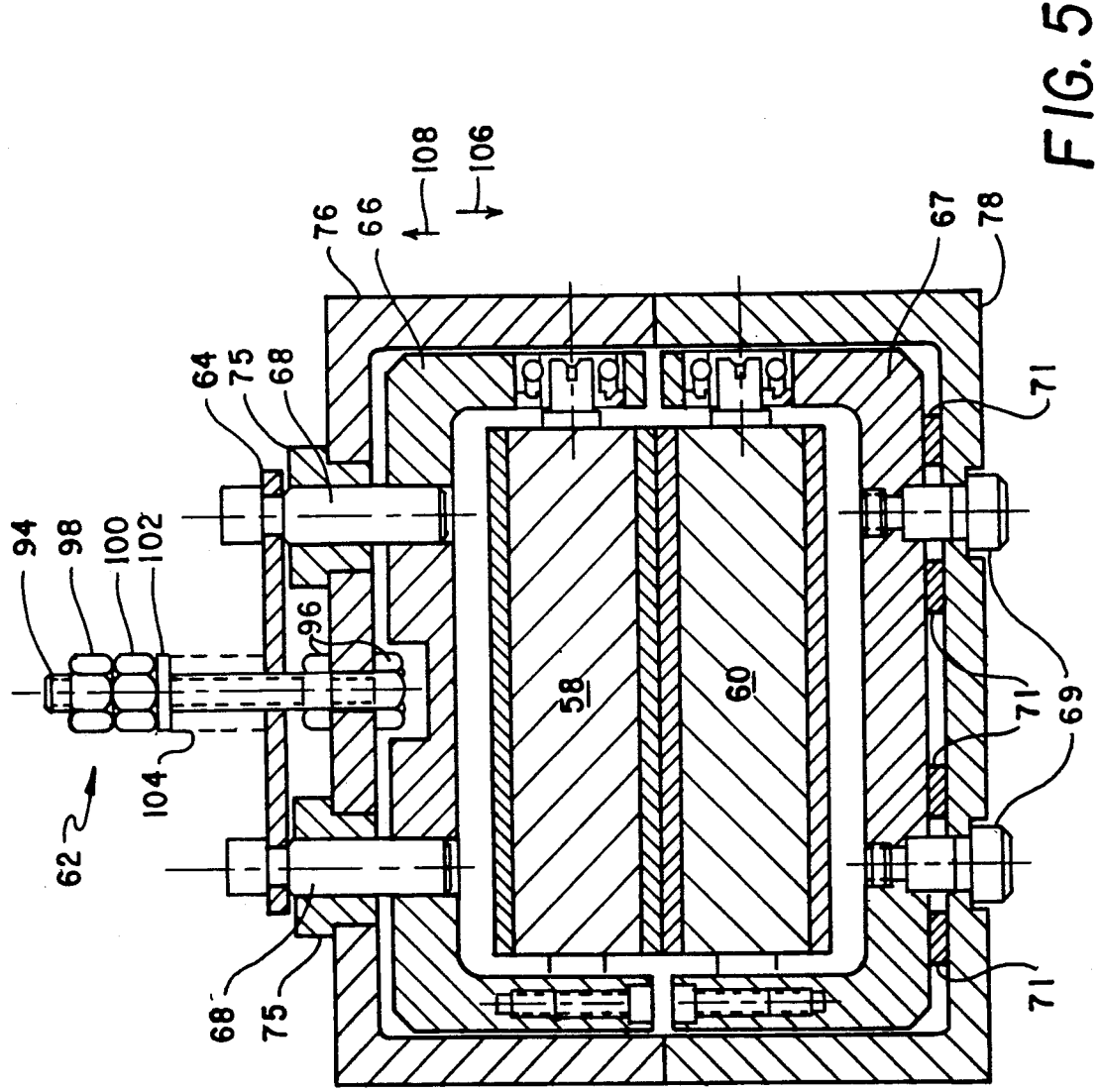
FIG. 5 is a cross-sectional view of the metering rollers.

Referring again to FIG. 3, the first and second metering rollers 58-60 comprise, for example, cylinders 90 covered with a rubber coating 92 such as, for example, Buna-N Rubber having a hardness of approximately 50 to 55 durometers. The second metering roller 60 is fixed in position relative to the moveable first metering roller 58. To properly position the rollers 58-60 to allow only the required amount of lube 42 to remain thereon, the first roller 58 is moveable with the pressure device 62. As best seen in FIG. 5, the pressure device 62 comprises a spring bracket 64 interconnected to a roller bracket 66 by dowels 68. The dowels 68 slidably pass through the top portion 76 of the container 30 through guide bushings 75. A bolt 94 is secured to the top portion 76 of the container 30 by nuts 96. The bolt 94 freely passes through the spring bracket 64. Nuts 98 and 100 hold a washer 102 in position over a compression spring 104 (as best seen in FIG. 3) which is positioned over the spring bracket 64. The positioning of the first roller 58 is thus controlled by the tightening or loosening of the nuts 98 and 100 to lower or raise the roller bracket 66.

The second roller 60 is fixed in position relative to the first roller 58 with a roller bracket 67. Fasteners 69 pass through the bottom portion 78 of the container 30 and are secured to the bracket 67. Spacers 71 are provided between the bracket 67 and the bottom portion 78 to properly fix the roller 60 in position. Although not shown, it is to be understood that other arrangements can be used to properly position and adjust the rollers 58–60.

In operation, the nuts 98 and 100 may be turned in a first direction on the bolt 94 to compress the spring 104 and lower the roller bracket 66 in a direction 106 and thus provide greater contact of the first and second rollers 58–60 with the tab stock 82. By turning the nuts 98 and 100 in a second direction opposite the first direction, the spring 104 is loosened and the roller bracket 66 is moved in a direction 108 to lessen the contact of the first and second rollers 58–60 with the tab stock 82. Thus as use of the lubricator 28 wears the rubber coating 92 on the rollers 58–60, contact therebetween with the tab stock 82 may be adjusted to continuously meter the correct amount of lube 42.

Referring again to FIG. 3, after having the correct amount of the lube 42 metered by the rollers 58–60, the tab stock 82 leaves the container 30 through the outlet 34. The correctly lubricated tab stock 82 then proceeds to the appropriate pull tab making equipment.

Due to the present invention, tab stock is evenly lubricated with a tab lube, and such lube may have a higher viscosity than previously used lubes. Consequently, if higher viscosity lubes are used, the pull tab making equipment (for example, tools and dies) will experience prolonged lifetimes.

Although the present invention has been described with respect to a specific referred embodiment thereof, various changes and modification may be suggested to one skilled in the art, and it is intended that the present invention encompass such changes and modifications as fall within the scope of the appended claims.

What is claimed is:

1. An apparatus for applying a lubricant to first and second substantially planar surfaces of a piece of sheet metal to provide a substantially uniform thickness of the lubricant on the first and second surfaces, comprising:
   means for applying the lubricant to the first and second surfaces of the sheet metal, the first surface being maintained at a first distance relative to a horizontal reference plane, the second surface being positioned above the first surface relative to said horizontal reference plane; and
   means for controlling a thickness of the lubricant on the first and second surfaces by advancing the sheet metal relative to said means for controlling, said means for controlling comprising:
   first and second means for engaging the lubricant on the first and second surfaces, respectively, said first and second means for engaging extending substantially across an entire width of the first and second surfaces, respectively, to provide for a substantially uniform thickness of the lubricant on the first and second surfaces, respectively, as the first and second surfaces advance relative to said first and second means for engaging, respectively, said first and second means for engaging comprising first and second rotatable roller means, respectively, and first and second wiper means, respectively, wherein an engaging surface of each of said first and second roller means is substantially parallel to the first and second surfaces of the sheet metal, respectively, wherein a position of a first plane coinciding with an interface of the first surface and said first means for engaging, said first plane being substantially parallel to the first surface, is substantially fixed relative to said horizontal reference plane to maintain the first surface at said first distance.

2. An apparatus, as claimed in claim 1, further comprising:
   means for removing foreign materials from the first and second surfaces of the sheet metal.

3. An apparatus, as claimed in claim 1, wherein:
   said second means for engaging is adjustable to vary a distance between said first and second means for engaging.

4. An apparatus, as claimed in claim 3, wherein:
   a second plane coinciding with an interface of the second surface and said second means for engaging remains substantially parallel upon any adjustment of said second means for engaging.

5. An apparatus, as claimed in claim 1, wherein:
   said second means for engaging is movable away from said first means for engaging against a means for biasing said second means for engaging toward said first means for engaging.

6. An apparatus, as claimed in claim 1, wherein:
   said first and second means for engaging comprise first and second wiper means, respectively, said first and second wiper means being angularly positionable relative to the first and second surfaces, respectively.

7. An apparatus, as claimed in claim 6, wherein:
   the sheet metal advances between said first and second wiper means in a first direction, said first and second wiper means extending from the first and second surfaces away from said first direction.

8. An apparatus, as claimed in claim 1, wherein:
   said second wiper means is movable away from said first wiper means, said second wiper means being biased toward said first wiper means, and wherein said second roller means is movable away from said first roller means, said second roller means being biased toward said first roller means.

9. An apparatus for applying a lubricant to first and second substantially planar surfaces of a piece of sheet metal to provide a substantially uniform thickness of the lubricant on the first and second surfaces, comprising:
   means for applying the lubricant to the first and second surfaces of the sheet metal; and
   means for controlling a thickness of the lubricant on the first and second surfaces as the sheet metal advances relative to said means for controlling in a first direction, said means for controlling comprising first and second wiper means for engaging the first and second surfaces, respectively, wherein a portion of each of said first and second wiper means extends substantially across an entire width of the first and second surfaces, respectively, wherein said first and second wiper means extend from the sheet metal at an angle in a direction away from said first direction, wherein said second wiper means is adjustable to vary a distance between said first and second wiper means, said second wiper means being biased toward said first wiper means, and wherein a support for said second wiper means is rotatable, a rotational axis of said support being substantially parallel to the second surface.

10. An apparatus, as claimed in claim 9, wherein: said means for controlling further comprises first and second rotatable roller means for engaging the first and second surfaces, respectively.

11. An apparatus, as claimed in claim 10, wherein: said second roller means is adjustable to vary a distance between said first and second roller means, said second roller means being biased toward said first roller means.

12. An apparatus, as claimed in claim 11, wherein: said second wiper means is adjustable to vary a distance between said first and second wiper means, said second wiper means being biased toward said first wiper means.

13. A device for lubricating a sheet metal material to be worked, comprising:
means for receiving and dispersing a lubricant to coat said sheet metal material passing through the device with said lubricant; and
means for controlling the amount of said lubricant on said sheet metal material, said means for controlling being separate from said means for receiving and dispersing and comprising:
    means for wiping excess amounts of said lubricant from said sheet metal material, said means for wiping comprising a first wiper and a second wiper opposite said first wiper, said first and second wipers being attached to first and second rollers, respectively, wherein said sheet metal material passes between said first and second wipers; and
    means for metering said lubricant remaining on said sheet metal material after said means for wiping, wherein said sheet metal material is uniformly covered with a predetermined amount of said lubricant.

14. A device for lubricating a sheet metal material to be worked, comprising:
means for receiving and dispersing a lubricant to coat said sheet metal material passing through the device with said lubricant; and
means for controlling the amount of said lubricant on said sheet metal material, said means for controlling being separate from said means for receiving and dispersing and comprising:
    means for wiping excess amounts of said lubricant from said sheet metal material, said means for wiping comprising a first wiper and a second wiper opposite said first wiper, said first wiper including means for adjusting said first wiper relative to said second wiper, said means for adjusting comprising a spring operably attached to said first wiper and an adjustable eccentric interconnected to said spring, wherein adjustment of said eccentric causes adjustment of said first wiper through said spring; and
    means for metering said lubricant remaining on said sheet metal material after said means for wiping, wherein said sheet metal material is uniformly covered with a predetermined amount of said lubricant.

15. A device for lubricating a sheet metal material to be worked, comprising:
means for receiving and dispersing a lubricant to coat said sheet metal material passing through the device with said lubricant; and
means for controlling the amount of said lubricant on said sheet metal material, said means for controlling being separate from said means for receiving and dispersing and comprising:
    means for wiping excess amounts of said lubricant from said sheet metal material; and
    means for metering said lubricant remaining on said sheet metal material after said means for wiping, said means for metering comprising a first covered roller and a second covered roller opposite said first covered roller, said sheet metal material passing between said first and second covered rollers, said first covered roller comprising means for adjusting said first covered roller relative to said second covered roller, said means for adjusting comprising a roller bracket for holding said first covered roller, a spring bracket, means for interconnecting said spring bracket and said roller bracket, and spring means for moving said spring bracket and thus said roller bracket to adjust said first roller, wherein said sheet metal material is uniformly covered with a predetermined amount of said lubricant.

16. The device of claim 15, wherein said means for interconnecting comprises:
at least one dowel fixed on a first end to said spring bracket and on a second end to said roller bracket.

17. The device of claim 15, wherein said spring means comprises:
a compression spring.

18. An apparatus for applying a lubricant to first and second substantially planar surfaces of a piece of sheet metal to provide a substantially uniform thickness of the lubricant on the first and second surfaces, comprising:
means for applying the lubricant to the first and second surfaces of the sheet metal; and
means for controlling a thickness of the lubricant on the first and second surfaces as the sheet metal advances relative to said means for controlling, said means for controlling comprising first and second wiper means for engaging the first and second surfaces, respectively, and first and second rotatable roller means for engaging the first and second surfaces, respectively, wherein a portion of each of said first and second wiper means and said first and second roller means extends substantially across an entire width of the first and second surfaces, respectively.

19. An apparatus, as claimed in claim 18, wherein: said second roller means is adjustable to vary a distance between said first and second roller means, said second roller means being biased toward said first roller means.

20. An apparatus, as claimed in claim 18, wherein: said second wiper means is adjustable to vary a distance between said first and second wiper means, said second wiper means being biased toward said first wiper means.

* * * * *